Figure 1:
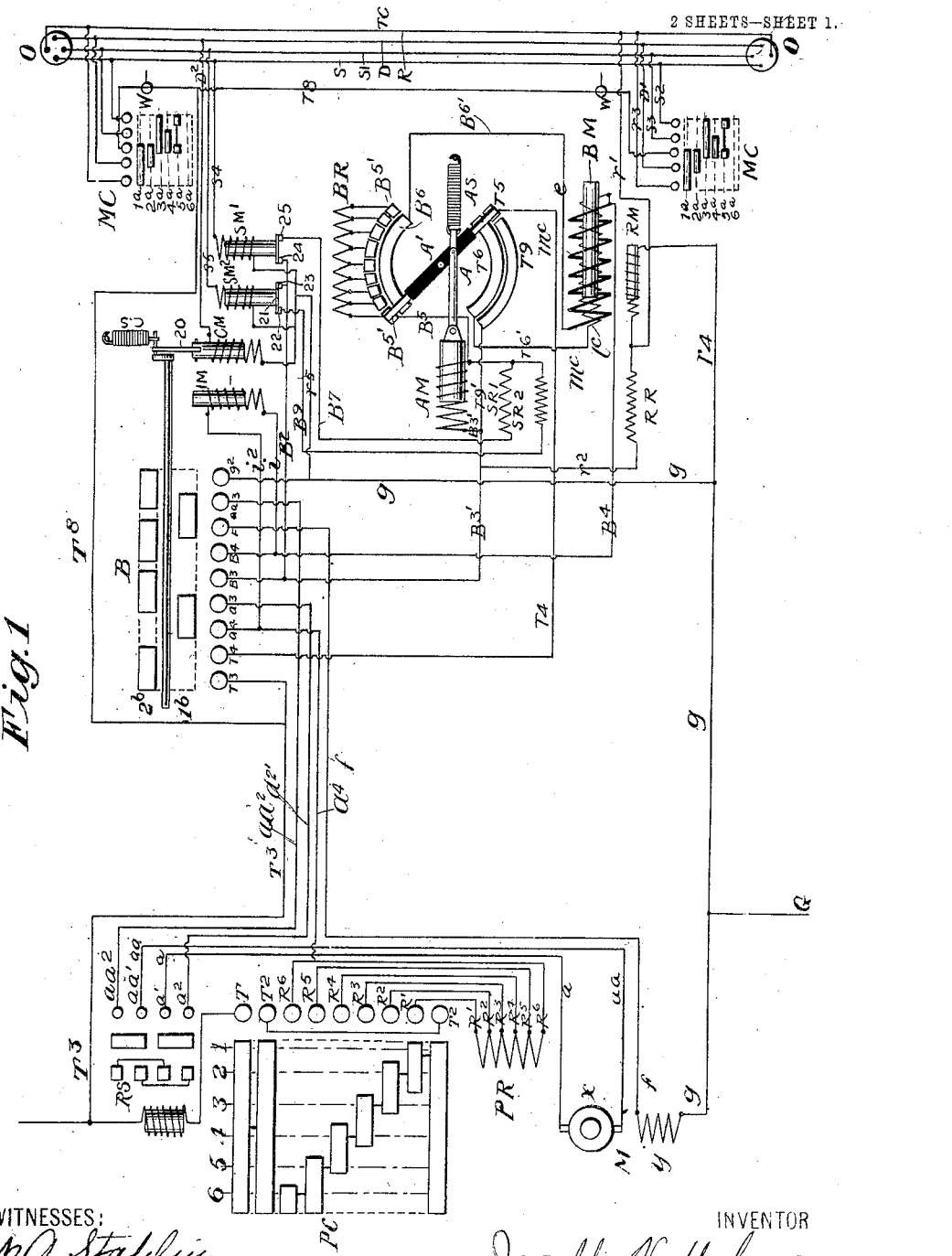

No. 813,052. PATENTED FEB. 20, 1906.
J. N. MAHONEY.
ELECTRIC BRAKE FOR VEHICLES.
APPLICATION FILED NOV. 8, 1901.

2 SHEETS—SHEET 2.

Witnesses
W. A. Stahlin
L. F. Browning

Joseph N. Mahoney Inventor
By his Attorneys
Baldwin, Davidson & Wight

UNITED STATES PATENT OFFICE.

JOSEPH N. MAHONEY, OF ASTORIA, NEW YORK, ASSIGNOR, BY MESNE ASSIGNMENTS, TO AMERICAN ELECTRIC BRAKE COMPANY, A CORPORATION OF NEW JERSEY.

ELECTRIC BRAKE FOR VEHICLES.

No. 813,052.   Specification of Letters Patent.   Patented Feb. 20, 1906.

Application filed November 8, 1901. Serial No. 81,604.

*To all whom it may concern:*

Be it known that I, JOSEPH N. MAHONEY, a citizen of the United States, residing in Astoria, city and State of New York, have invented certain new and useful Improvements in Electric Brakes for Vehicles, of which the following is a specification.

This invention relates generally to that class of electric brakes in which the motors for propelling the car or vehicle are operated as generators to effect the braking operation and resembles in some respects the system shown in my Patent No. 665,450, dated January 8, 1901, upon which it may be said to be an improvement, although it also comprises features applicable to other braking systems.

An object of the invention is to provide an organization in which the rate of retardation may be maintained constant, or substantially so, regardless of the speed of the car and, if desired, at a maximum permissible without locking the wheels, in which the brake apparatus is in operation at all times following the initial act of the motorman to apply the brake either by the action of line-current or current from the motor or motors running as a generator, and to utilize at all times all the metal in the winding of the electromagnetic brake apparatus. Since each unit in such a system is so controlled individually, the system is particularly well adapted to a system of multiple control; and multiple control of brake mechanism on any number of units in a train constitutes a further feature of the invention.

In the electric braking of an electrically-propelled car or vehicle where the motor or motors are driven as generator by the momentum of the car to deliver the current for effecting the braking operation factors to be considered are the retardation or negative torque offered by the motor to being so driven and the character of the braking-surfaces, with their incidental variation of coefficient of friction due to speed variation and period of time of braking operation, which is in turn a function of the speed. This invention contemplates recognition of such factors and such control of the pressure between braking-surfaces in relation to the factors (speed of the car and output of the motors running as a generator) as that a substantially uniform rate of retardation of the car at all speeds may be obtained. Theoretically in any give case with proper adjustment of the controlling devices and apparatus a uniform rate of retardation is obtainable. Practically the controlling devices may in all cases be effective to increase the efficiency of the braking operation to approach as near as the conditions allow the theoretically perfect condition of a constant rate of retardation.

The several features of the invention are hereinafter described.

Figure 2:
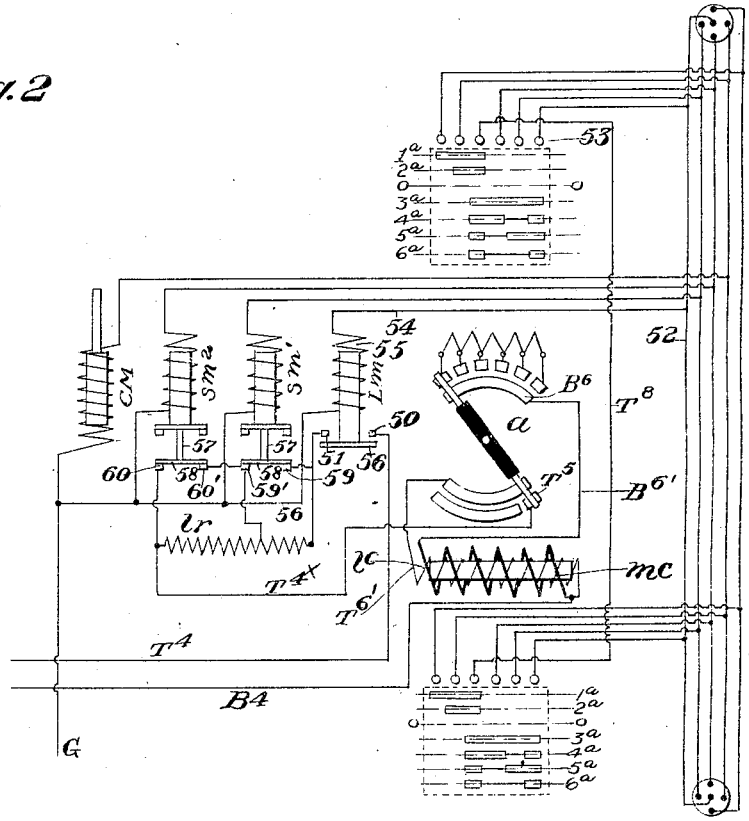

In the accompanying drawings, Figure 1 is a diagram illustrating the invention, showing conventional illustrations of the various pieces of apparatus; Fig. 2, a similar view of a modified organization, and Fig. 3 a diagram showing two connected cars or units.

The apparatus may vary in practical construction. It is also true that the general arrangement adopted may be changed or modified without material change of or departure from the characteristic features of this invention. I do not, therefore, wish to be understood as limiting myself either to the identical pieces of apparatus indicated or to the identical mode of wiring. It is also true that some of the features of this invention may be used without others, and this in systems otherwise differing from that herein shown and described.

The drawings show an equipment of a single car. Other cars similarly equipped may be electrically connected thereto by a train-cable and the whole train or assemblage of units controlled from a master-controller on any one of the cars.

Each car or unit may have one or more motors, one only being shown in the diagram and marked M, a power-controller P C, reversing-switch R S, trolley or other device for collecting current from the main or working circuit, a rheostat P R, associated with or forming part of the power-controller, and necessary wiring for electrically connecting the several instrumentalities. In a multiple-unit system the power-controller and reversing-switch may be controlled and operated from a master power-controller by any of the approved sytems now in use or by any suitable or appropriate system. The master power-controller and master brake-controller (hereinafter described) might be combined, movement of the handle in one direction affording control of the motor and in the other of the braking apparatus.

The car-brake equipment as depicted in the diagram includes for each vehicle or unit a train-cable T C, having terminal couplers O, master-controllers M C, shunt-controller magnets or relays S M' and S M², controlling shunt resistances S R' S R², controller-magnet C M, operating in conjunction with the spring C S, brake-controller B, and release-magnet R M. These several instrumentalities are or may be controlled by the respective master-controllers through suitable circuit connections hereinafter described. The organization illustrated also comprises an interlock-magnet I M, an automatic braking current-controller A comprising contacts B⁵', contacts B⁸, T⁵, T⁶, and T⁹, a pivoted contact-arm A', that sweeps these contacts, an actuating-magnet A M and its coöperating spring A S, and a brake-magnet B M, wound with the coils $mc$ and $lc$. The spring A S, coöperating, as hereinafter described, with the magnet A M, is employed in preference to utilizing weight and gravity, since it is believed that a spring in this relation will be more satisfactory. The mode of applying the energy to brake the vehicle may be of any appropriate character. The braking device or apparatus may have the braking coil or coils combined directly with it, or it may be actuated mechanically from the armature of the brake-magnet B M, as shown, for instance, in my Patent No. 665,450. The release-magnet and interlock-magnet may be constructed and arranged as in said prior patent or may be otherwise organized to accomplish the functions assigned to them. The primary features of this invention are not dependent upon their presence, although they are valuable adjuncts or elements of this improved system. The power-controller, reversing-switch, brake-controller, and master-controllers may be of any appropriate construction, and the remaining parts of the organization shown in the diagram may be of any suitable character fitting them to perform their respective functions. Where parts are diagrammatically shown as solenoids they may be electromagnets with fixed cores and movable armatures.

When a master-controller on a car is operated, the following results are produced, and if one or more other cars be coupled together the same operations will simultaneously be effected on each unit of the train: If a master-controller M C be moved to the position indicated by line 1ª, a circuit from the power-conductor is completed through the shoe or trolley of the car or unit on which the master-controller is located. This circuit is from the trolley or shoe through the wires T³, T⁸, D', and $r^3$ to the wires D and R of the train-cable, and on each car or unit from the train-cable conductor R by wire $r'$ through the winding of the release-magnet R M and wire $r^4$ to ground or return conductor at G; also, from the train-cable conductor D by wire D², through the coil of the controller-magnet C M and wires $r^5$ $g$, to ground or return at G. This energization of the release-magnets throws off the brake-locking device, and shoes or other brake devices will be relieved of pressure. The operation may be as, for instance, shown in my Patent No. 665,450. The vitalization of the controller-magnet C M effects, through the medium of the link or pitman 20 applied to a crank on the shaft of the brake-controller B, a transfer of the brake-controller into the position indicated by the line 1ᵇ, thereby completing a circuit for admission of current to the motor from the power-controller for the movement of the car or unit. This circuit is from finger T to both contacts, (marked T²,) to contact R' in the first position of the car-controller, through the resistance P R, through the wire $a^4$ to contact $a^4$ on the brake-controller, then to contact $a^3$ on the brake-controller, wire $a^{2'}$, contact $a^2$ of the reversing-switch to the contact $a'$ of reversing-switch, wire $a$ to the motor-armature $x$, wire $a$ $a$, contact $a$ $a'$ of reverse-switch, contact $a$ $a^2$ on reverse-switch, wire $a$ $a^2$ to contact $a$ $a^3$ on brake-switch, contact F on brake-switch, wire $f$ through motor field-coil Y, wire $g$, and ground or return. When the master-controller M C is advanced to its second position, (indicated by the line $a^2$,) current is still admitted to the coil or coils of the controller-magnet C M. When the master-controller is advanced to the position indicated by the line 3ª, a circuit is completed from the wire T⁸, through wires S² S³, to the wires S S' of the train-cable and thence (in each unit or car) by wires S⁴ S⁵ through the respective windings of the shunt-controllers or relays S M' S M² and by wire $r^5$ to $g$ and ground or return at G. In this position of the master-controller the circuit through the controller-magnet C M is open, and the spring C S, applied to the crank on the shaft of the brake-controller B, throws that controller to the position indicated by the line 2ᵇ. This opens the circuit at $a^3$, $a$ $a^3$, F and at the contact $a^4$ of the brake-controller from the source of power through the trolley or shoe to the motor, and at the same time the following circuits are completed: from the trolley by wire T³, contacts T³ T⁴ of brake-controller and wire therefrom, (also marked T⁴,) contact T⁵ of automatic braking current-controller A, contact-arm A' to contact T⁶, thence by wire T⁶ to one terminal of the winding or line coil $lc$ of the brake-magnet B M, the opposite terminal of which is connected by wire B⁴ to the correspondingly-marked contact of the brake-controller B, thence to contact F of that controller and wire $f$, through the field-winding Y of motor M, to $g$ and to ground or return at G. Another circuit is completed from the motor-armature X through wire $a$, contacts $a'$ $a^2$ of the reversing-switch, wire $a^{2\prime}$, contact $a^3$ and $B^3$ of the brake-controller, and by wire $B^{3\prime}$ to one terminal of the winding A M of the automatic controller-magnet, the opposite terminal of which is connected by wire $B^5$ to the series of resistance-contacts $B^{5\prime}$ through one end of the switch-arm A' to the segmental contact $B^6$, thence by wire $B^{6\prime}$ to wire $e$ through the winding $mc$ of the brake-magnet, thence by wire $B^4$, correspondingly-marked contact of the brake-controller, contact F, wire $f$ to one terminal of the field-winding Y of the motor M, thence from the opposite terminal thereof by wire $g$ to contact $g^2$ of the brake-controller adjoining contact $a\ a\ a^3$, thence by wire $a\ a^3$, correspondingly-marked contact of reversing-switch, thence by contact $a\ a'$ of that switch, and then by wire $a\ a$ back to the armature X of the motor. The passage of current through the shunt-magnets or relays S M' S M², which occurs in this third position of the master-controller, opens the circuits of the shunt resistances S R' S R², placed around the winding A M of the automatic controller. Of course the same relation of the resistances S R' S R² to the winding A M might be established by the energization of the magnets or relays S M' S M², the apparatus being properly constructed for that purpose. The amount of current now passing through the winding A M of the automatic controller is determined by the speed of rotation of the motor-armature (and hence by the speed of the car) and the strength of the spring A S, the reaction of which in opposition to the pull of the magnet A M determines the position of the end of the switch-arm upon the series $B^5$ of resistance-contacts and relatively to the speed of the car holds the current at a desired strength variable within certain limits, whether the speed of the motor is relatively great and the voltage high or the speed relatively slow and the voltage low. Under the conditions last described the opposite or lower end (as viewed in the drawings) of the switch-arm A' transfers the fine winding $lc$ of the brake-magnet B M from the trolley or source of power—i. e., from the contact $T^5$ to the contact $T^9$, which is connected to one terminal of the motor-armature now acting as a generator by the wire $T^{9\prime}$, wire $B^{3\prime}$, brake-controller contacts $B^3\ a^3$, wire $a^2$, reverse-switch contacts $a^2$, $a'$, and wire $a$. The circuit from the contact $T^9$ through the coil $lc$ to the opposite armature-terminal is from the lower end of the switch-arm A' to contact $T^6$, wire $T^{6\prime}$, coil $lc$, wire $B^4$, brake-controller contacts $B^4$ F, wire $f$, through the motor-field Y, wire $g$, brake-controller contacts $g^2$, $a\ a^3$, wire $a\ a^2$, reverse-switch contacts $a\ a^2$, $a\ a'$, and wire $a\ a$. This places the coil $lc$ of the brake-magnet across the terminal of the motor in shunt relation to the winding of the automatic controller-magnet A M, the resistance B R, and the brake-magnet coil $mc$, which are all in series, and applies a voltage to the coil $lc$ that varies directly or substantially as the speed of travel of the car or unit. Another circuit is from the wire $B^{3\prime}$, which is of the circuit of the motor running as a generator, through the wire $r^2$, resistance R R, winding of release-magnet R M, and wire $r^4$ and $g$ to ground and the other side of the motor-circuit, allowing an amount of current determined by the resistance R R and the voltage in the generator-circuit due to the speed of the unit to flow through the release-magnet R M, which operates to throw off the locking device of the brake mechanism at all speeds above the predetermined one.

When the power-controller P C is moved to a position to admit current to the motor for the propulsion of the car and the brake-controller is then shifted to the position indicated by the line $2^b$, which is the braking position, and thereby opens the connections from the power-circuit to the motor, a circuit is established through the power-controller from the trolley or shoe to the wire $a^4$. This circuit is from finger T to both contacts $T^2$, to contact R' in the first position of the car-controller, and through resistance P R to wire $a^4$. From thence the circuit is through wire $i^2$ and the coil of interlock-magnet I M, thence by wire $i$ and brake-controller contacts $B^4$ and F and wire $f$ through the field-winding Y of the motor, and thence to G or the other side of the circuit. The interlock-magnet then locks the brake-controller in braking position, and so holds it until the power-controller is thrown off.

In the fourth position of the master-controller (indicated by line $4^a$) the circuit of the shunt magnet or relay S M² is still maintained completed, and its armature 21 is lifted from the contacts 22 23, and the circuit of the shunt resistance S R² is open. The coil of the shunt-magnet S M', however, not now being energized, the circuit of the shunt resistance S R' is closed at the contacts 24 25, thus completing a shunt-circuit around the automatic magnet A M from the wire $B^{3\prime}$ through $B^2$, contacts 24 25, wire $B^7$, shunt resistance S R', to wire $B^5$. The effect of this is to weaken the automatic magnet A M, permitting the spring A S to overcome the magnet A M and cause the upper end of the arm A' to cut out some of the resistance B R at the contacts $B^{5\prime}$ and cause an increase of current in the motor coil-circuit $mc$ of the brake-magnet, thereby adding to the braking effect to a predetermined extent. Other circuits remain the same as when the master-controller is in the third position already described.

In the fifth position of the master-controller the circuit through the shunt-magnet S M' is closed, while that through the shunt-magnet S M² is open, thus closing a circuit around the automatic magnet A M as follows: from wire B³' through B², contacts 22 23, wire B⁹, shunt resistance S R², and thence to wire B⁵, thereby placing the shunt resistance S R² across the terminals of the winding A M. The resistance S R² being lower or less than S R', the increased current is allowed to pass through the braking-circuit, thereby increasing the braking action. Other circuits remain the same as in positions 3ª and 4ª.

In the sixth position of the master-controller, (indicated by the line 6ª,) both shunt resistances S R' S R² are connected across the terminals of the automatic magnet A M, and the braking action is at a maximum. In this sixth position it will be noted that all the master-controller circuits are open, the effect being the same as in the case of the opening or breaking of the circuits of the train-cable. The condition would then be the same as if a train broke apart, and the brakes would be applied to the rear unit or section to prevent it colliding with the front unit or section. A switch W may be placed in the wire leading from the trolley or source of power to each master-controller, so that the controller may be thrown out of circuit when desired.

As has been stated, the automatic braking current-controller A is so proportioned with respect to the coöperative action of the coil A M and the spring A S as to gradually increase the current in the brake-operating circuit from a minimum to a maximum, and vice versa, as the end of the arm A' travels over the series B⁵' of resistance-contacts, assuming different positions thereon due to different speeds of the car. The current in the braking-circuit automatically increases, and consequently the braking action on the car due to the motors and braking-shoes as a whole is increased within limits as the speed of the car increases, and a greatly-increased efficiency in the braking operation is therefore obtainable.

When the car is running at very low speeds, the motor or motors would probably not furnish enough energy to stop the car quickly, even though the field of the motor be excited by the line-current, as described, and for this reason it is an advantage to have the winding of the electromagnetic braking apparatus adapted to utilize efficiently energy from the line as well as from the motor or motors. Excitation of the motor-field by the line-current is a desirable condition in that it enables the motor to build up more rapidly and more certainly when operating as a generator; but this arrangement is not an essential feature of this invention. In my prior patent, No. 665,450, I have shown an electromagnetic brake apparatus wound with several coils, adapted to receive first the line-current and then to be transferred and properly commutated to the motor-circuit. Under some conditions there may be several electromagnetic brake coils or apparatus, and their several coils may be commutated in like manner. In the present invention I have shown separate coils, one, $lc$, adapted to line-current, and another, $mc$, adapted to current from the motor running as a generator. These two coils being normally in circuit and $lc$ fed initially through the brake-controller from the line, the action of the automatic switch A is to open the circuit from the line to the brake-magnet winding at the contact T⁵ and to connect the line-coil $lc$ in shunt to the coil A M, resistance B R, and coil $mc$ of the motor brake-circuit, thereby utilizing at all times all of the wire in the brake apparatus, and at the same time I obtain the advantage of having the braking action proportional, or substantially so, to the speed of the car.

In this system the braking action may be maintained at a constant efficiency, or substantially so, for all speeds and may be that which, all things considered, is most desirable. At the same time it may be increased by any desired number of gradations at any speed of the car to meet special or emergency conditions. In any position of the controlling master-controller the rate of retardation is automatically maintained by the automatic controller A to afford the most effective braking operation for the then existing conditions. In a train or series of units governed from a single master-controller on one of the cars there is therefore automatically maintained a uniform braking action on all the units. By properly proportioning the working capacity of the magnet A M and its spring A S such results as are desired are obtainable.

The several positions of the master-controller and resultant circuits may be briefly stated, as follows: In the position 1ª a circuit from the trolley is established through the release-magnet R M, thereby throwing off the locking device of the brake, and a second circuit through the controller-magnet C M, thereby throwing the brake-controller B to the position 1ᵇ to admit current from the source or trolley to the motor. In the position 2ª the circuit from the trolley through the controller-magnet is still maintained, but that through the release-magnet is open. In the position 3ª the circuit from the trolley through the controller-magnet is also open, and the spring C S thereof throws the brake-controller B to the position indicated by 2ᵇ. The following circuits are established:

First. From the trolley by wires T³ and T⁸ and other connections through the windings of the relays S M' S M², thereby holding open both shunt-circuits containing the resistances S R' S R², connected around the coil A M.

Second. From trolley by wire T³, brake-controller contacts I³ I⁴, and wire T⁴ to contact T⁵ end of arm A', and contact T⁶ through the high-resistance brake-winding $lc$, and thence through the field Y of the motor, the effect being to produce the braking action by means of the coil $lc$ and to excite the motor.

Third. From motor-armature X through winding A M, resistance B R, contact B⁶, and wire marked $e$ and B⁶′ through the brake-wire and B⁶′ through the brake-winding $mc$, thence to the motor-field and back to armature. The motor being now operated as a generator, a braking action is produced by the action of the coil $mc$ of coarser wire than the other winding. On a sufficient rise of current in this circuit the armature of A M is attracted and the fine-wire coil $lc$ is transferred from the trolley-circuit to the motor or braking circuit, being connected across the terminals of the motor in parallel with the coil $mc$, which is in series with the winding A M and the brake-resistance B R.

Fourth. From one terminal of the motor through resistance R R and release-magnet R M. The resistance R R and the winding of the release-magnet are such that the latter is operated to throw off the locking device of the brake mechanism at all speeds of the car (or braking action) above a predetermined one.

Fifth. When power-controller contacts are in position to admit current and the brake-controller is in position $2^b$, which is braking position, and cuts off current from the trolley to the motor, a circuit is established from the trolley through the interlock-magnet I M, and it locks the brake-controller in braking position and so holds it until the power-controller is thrown off or into a position in which current from the trolley is not admitted to the motor.

In a position $4^a$ of the master-controller the circuit S M′ is open and S R′ is closed in shunt around the winding of A M, thus weakening A M and causing a rise of current in the coil $mc$ and an increasing braking action. In the next position $5^a$ of the master-controller the circuit S M′ is closed and S M² open, thereby closing S R² in shunt around A M. S R² being of less resistance than S R′, an increased current passes in the braking-circuit and an increased braking action results. In the position $6^a$ of the master-controller both resistances S R′ S R² are closed around A M and the braking action rises to a maximum. This is a condition that would exist in a multiple-unit system in the rear unit or units should the train break apart.

So far as I am aware I am the first to provide in an electric-braking system means acting automatically for regulating the braking-current relatively to the speed of the car or to automatically regulate the braking action, or the braking action of the current relatively to the speed of the car, and thereby make it possible to maintain a constant maximum rate of retardation, utilizing the maximum adhesion of the wheels, and such subject-matter I claim, generically, as my invention. Obviously the invention, broadly considered, is not dependent upon the special arrangement or organization disclosed, but may be accomplished in other ways by those skilled in the art.

So far as I know I am the first to provide a multiple-unit system of automatic electric-brake control, and such subject-matter I claim generically as my invention.

The diagram Fig. 2 shows a modification which comprises a change in the mode by which the high-resistance brake-winding $lc$ is thrown into circuit with the source and also an arrangement by which the braking action of the coil $lc$ may be controlled by resistances. In this organization the power-controller and reversing-switch may be the same as shown in Fig. 1, and therefore they are not illustrated, and the brake-controller B may also be the same, except that its contacts T³ T⁴ and the corresponding plate that bridges them are omitted. The wire T⁸ is in this case connected directly to the wire T⁴ˣ, which passes to contact 50, having a corresponding contact 51 connected through a resistance $lr$ to the contact T⁵ of the automatic controller. An extra or fifth wire 52 is placed in train-cable and is provided with a contact 53 in each master-controller and which in the positions $3^a$ $4^a$ $5^a$ $6^a$ of the master-controller are electrically connected with the connection T⁸. In the position $3^a$, &c., of the master-controller a circuit is established from the source or trolley to contact 53, train-cable wire 52, to wire 54, winding of relay or magnet 55, and thence by wire 56 to ground or return. On the energization of coil of magnet 55 its armature is attracted and a contact-bar 56, carried thereby, bridges the contacts 50 51 and connects the coil $lc$ in circuit with the trolley, the same operation accomplished in the organization of Fig. 1 by the brake-controller at the contacts T³ T⁴. This condition is maintained as long as the master-controller is in any of its braking positions. To provide for regulation of the braking action of the coil $lc$, as well as that of the coil $mc$ when both are in action and also to provide for regulation of the coil $lc$ in the event of it only being in action, as might be the case in event of accident to the motor or rupture of the braking-circuit thereof, I attach projections 57 57 to the armature of each of the relays S M′ S M² and provide each such projection with a cross-bar 58, adapted to bridge corresponding contacts 59 59′ and 60 60′. The contacts 59′ and 60′ are connected to the resistance $rl$ between its ends, while the contacts 59 and 60 are connected with opposite ends of the resistance. The operation is obvious. When the master-controller is in position to connect the resistance S R′ or S R², or both of them, in circuit, part or all of the resistance $lr$ is shunted out of the circuit of the coil $lc$. Except as described, all other parts of the apparatus should, are, or may be the same as in Fig. 1, and their duplication seems unnecessary. Corresponding parts have been correspondingly lettered. In Fig. 1 the point at which the handle of the master-controller may be removed can be that indicated by the line 6ᵃ 6ᵃ. In Fig. 2, 0 0 indicates a dead or inactive position of the master-controller in which the handle may be removed. In this organization the circuit of the motor when it commences to operate as generator is one of low resistance, but is automatically controlled by rise of current therein to prevent injury of the motor. In this respect the control is taken entirely from the motorman, although by manipulation of the brake master-controller he may vary the rate of retardation in the manner described. The release-magnet R M is energized, as already described, when the brake master-controller is moved in a direction to permit current from the main source or trolley to pass to the motor. During the braking operation when the motor is running as a generator in the braking-circuit the release-magnet is connected across the terminals of the motor in shunt to all other apparatus in this circuit and in series with the resistance R R, which may of course be adjustable, (as all resistances herein mentioned may be.) The resistance-winding of the magnet and adjustment of its armature may all be so related that the release-magnet armature will be actuated to throw off the brake-locking device when current or voltage in the braking-circuit has reached a given strength. These conditions may by adjustment be made approximately or substantially equal on all units coupled together in a multiple-unit system.

Figure 3:
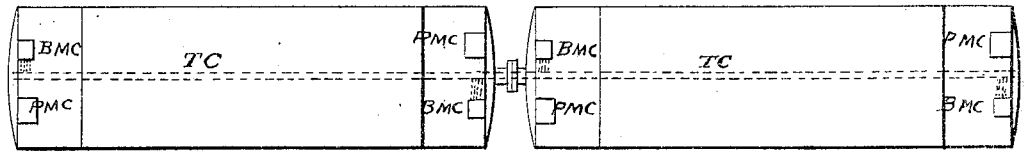

It is obvious that the interlock-magnet on each unit in a multiple-unit system will be controlled, as described, to hold the brake-controller in such position as to cut off current from the main source or trolley to the motor until the power-controller is thrown to a position in which it does not admit current to the motor. A complete control of each unit is therefore afforded. Fig. 3 shows diagrammatically two cars or units coupled to travel together with their train-cables electrically connected or coupled. The brake master-controllers are marked B M C in this figure and the power master-controllers P M C. On each unit there will be one power-controller and one brake-controller. As indicated in Fig. 1, these are represented as two separate pieces of apparatus. The functions performed by them and by the reversing-switch might all be combined in a single apparatus having proper contacts and circuit connections.

It is well known that the coefficient of friction between the braking-surfaces does not vary directly as the speed of the moving surface—that is to say, not directly as the speed of the vehicle—and therefore it is designed in this system that the action of the automatic controller shall be such as to reduce the braking pressure between the friction-surfaces in such relation to the before-mentioned factors as to afford a constant rate of retardation at all speeds during the stopping or braking operation. When the car is running at high speed and the braking system is thrown into operation and the car is brought to a stop by the maximum constant rate of retardation, the pressure between the braking-surfaces should decrease in a greater ratio than the speed of the car during some portions of the braking operation, and in less ratio in other portions, the operation being dependent on the relative importance of the several factors before mentioned as incident to a braking operation. As the car, however, approaches a standstill the pressure should decrease in a less ratio than the speed, so that some substantial pressure between the braking-surfaces will therefore exist and may be retained by retaining devices, such as those hereinbefore referred to for the purpose of holding the car on a grade. This relation of braking pressure and car speed for efficient braking is desirable, because, as is well known, the coefficient of friction does not increase in the same ratio as the speed decreases. Of course when the car is running at a comparatively low speed and the braking system is thrown into operation it may well be that during the entire braking operation the pressure will be reduced in a less ratio than the speed. Of course the motorman by means of the control placed at his disposal in this system may effect a stop of a car traveling at high speed without availing of the maximum rate of retardation, where, for instance, he has ample time within which to bring the car to a stop. At very low car speeds these refinements are not particularly material. The purpose of this system, however, is to obtain when desired the highest efficiency of braking operations at high speeds and complete control of the car at all speeds.

I claim as my invention—

1. The combination with an electric braking system, of an automatically-acting controller mounted on the vehicle and operating to control or vary the braking-current within appropriate limits in relation to the speed of the vehicle to thereby vary the pressure between the braking-surfaces and increase the efficiency of the braking operation.

2. The combination with an electric braking system comprising a brake-magnet having two windings acting to produce pressure between braking-surfaces, of an automatic controller acting to regulate or control the braking-current within appropriate limits relatively to the speed of the vehicle in one of said windings.

3. The combination with an electric braking system comprising a brake-magnet having two windings acting to produce pressure between braking-surfaces, of an automatic controller acting to control the braking-current in one of said windings.

4. An electric braking system comprising a brake-magnet having two windings of different resistance both fed from the vehicle-motor running as a generator, an automatically-acting controller regulating the current within appropriate limits relative to the speed of the vehicle in the winding of lower resistance, the circuit of the other winding being of constant resistance and the current therein varying according to the speed of the vehicle.

5. An electric braking system comprising a brake-magnet having two windings of different resistance both fed from the vehicle-motor running as a generator, an automatically-acting controller for controlling the current in the winding of lower resistance, the circuit of the other winding being of constant resistance and the current therein varying according to the speed of the vehicle.

6. In an electric braking system, a brake-winding acting to produce pressure between braking-surfaces and fed through two circuits one of which is of constant resistance, and means for varying the resistance of the other relatively to the speed of the vehicle.

7. An electric braking system comprising opposed braking-surfaces and means for controlling the pressure between them by two currents one of which varies relatively to the speed of the car and the other of which is appropriately controlled, whereby the pressure between the braking-surfaces is varied in relation to the speed of the vehicle and the efficiency of the braking operation increased.

8. In an electric braking system, a brake-operating apparatus comprising two independent circuits of different resistance both fed by the vehicle-motor running as a generator, one of the circuits being of constant resistance and causing a braking action substantially proportional to the speed of the vehicle, and means for automatically varying the resistance of the other circuit within appropriate limits relative to the speed of the car.

9. In an electric braking system, a braking apparatus comprising two independent circuits one of constant resistance which is fed at one time from the main source for propelling the vehicle and at another time from the vehicle-motor running as a generator, and means for varying the current in the other circuit, which is fed from the vehicle-motor, within appropriate limits relatively to the speed of the vehicle.

10. In an electric braking system, a braking apparatus comprising two independent circuits one of constant resistance which is fed at one time from the main source for propelling the vehicle and at another time from the vehicle-motor running as a generator, and means for varying the resistance of the other circuit, which is fed from the vehicle-motor.

11. The combination with an electric braking system, of an electromagnetic automatic controller mounted on the vehicle and operating to control or vary the braking-current within appropriate limits in relation to the speed of the vehicle to thereby vary the pressure between the braking-surfaces whereby increased efficiency of the braking operation is attained and means under the control of the motorman for varying at will the effective current in the winding of the electromagnetic controller.

12. The combination with an electric braking system, of an automatic electromagnetic controller mounted on the vehicle and operating to control resistance in the braking-circuit to thereby vary the pressure between the braking-surfaces in relation to the speed of the vehicle whereby increased efficiency of the braking operation is attained, and means under the control of the motorman for varying the effective current in the winding of the electromagnetic controller.

13. The combination with an electric braking system comprising a brake-magnet having two windings acting to produce pressure between braking-surfaces, of an electromagnetic automatic controller acting to regulate or control the braking-current within appropriate limits relatively to the speed of the vehicle in one of said windings.

14. The combination with an electric braking system comprising a brake-magnet having two windings acting to produce pressure between braking-surfaces, of an electromagnetic automatic controller acting to regulate or control the braking-current within appropriate limits relatively to the speed of the vehicle in one of said windings, and means under the control of the motorman for varying at will the effective current in the winding of the electromagnetic controller.

15. The combination with an electric braking system comprising a brake-magnet having two windings acting to produce pressure between braking-surfaces, of an electromagnetic automatic controller acting to control the braking-current in one of said windings.

16. The combination with an electric braking system comprising a brake-magnet having two windings acting to produce pressure between braking-surfaces, of an electromagnetic automatic controller acting to control the braking-current in one of said windings, and means under the control of the motorman for varying at will the effective current in the winding of the electromagnetic controller.

17. An electric braking system comprising a brake-magnet having two windings of different resistance both fed from the vehicle-motor running as a generator, an electromagnetic automatically-acting controller regulating the current within appropriate limits relative to the speed of the vehicle in the winding of lower resistance, the circuit of the other winding being of constant resistance and the current therein varying according to the speed of the vehicle.

18. An electric braking system comprising a brake-magnet having two windings of different resistance both fed from the vehicle-motor running as a generator, an electromagnetic automatically-acting controller regulating the current within appropriate limits relative to the speed of the vehicle in the winding of lower resistance, the circuit of the other winding being of constant resistance and the current therein varying according to the speed of the vehicle and means under the control of the motorman for varying at will the effective current in the winding of the electromagnetic controller.

19. An electric braking system comprising a brake-magnet having two windings of different resistance both fed from the vehicle-motor running as a generator, an electromagnetic automatically-acting controller for controlling the current in the winding of lower resistance, the circuit of the other winding being of constant resistance and the current therein varying according to the speed of the vehicle, and means under the control of the motorman for varying at will the effective current in the winding of the electromagnetic controller.

20. An electric braking system comprising a brake-magnet having two windings of different resistance both fed from the vehicle-motor running as a generator, an electromagnetic automatically-acting controller for controlling the current in the winding of lower resistance, the circuit of the other winding being of constant resistance and the current therein varying according to the speed of the vehicle.

21. The combination with an electric braking system comprising a brake-magnet having two windings acting to produce pressure between braking-surfaces, of an automatic controller acting to regulate or control the braking-current within appropriate limits relatively to the speed of the vehicle in one of said windings and means whereby the motorman may at will control within limits the action of the automatic controller.

22. The combination with an electric braking system comprising a brake-magnet having two windings acting to produce pressure between braking-surfaces, of an automatic controller acting to control the braking-current in one of said windings and means whereby the motorman may at will control within limits the action of the automatic controller.

23. An electric braking system comprising a brake-magnet having two windings of different resistance both fed from the vehicle-motor running as a generator, an automatically-acting controller regulating the current within appropriate limits relative to the speed of the vehicle in the winding of lower resistance, the circuit of the other winding being of constant resistance and the current therein varying according to the speed of the vehicle and means whereby the motorman may at will control within limits the action of the automatic controller.

24. An electric braking system comprising a brake-magnet having two windings of different resistance both fed from the vehicle-motor running as a generator, an automatically-acting controller for controlling the current in the winding of lower resistance, the circuit of the other winding being of constant resistance and the current therein varying according to the speed of the vehicle and means whereby the motorman may at will control within limits the action of the automatic controller.

25. In an electric braking system, a brake-winding acting to produce pressure between braking-surfaces and fed through two circuits one of which is of constant resistance, and means for varying the current in the other circuit, within appropriate limits, relatively to the speed of the vehicle.

26. In an electric braking system, a brake-winding acting to produce pressure between braking-surfaces and fed through two circuits one of which is of constant resistance and an automatic electromagnetic controller for varying the current in the other circuit, within appropriate limits, relatively to the speed of the vehicle.

27. The combination with an electric braking system comprising a brake-winding acting to produce pressure between braking-surfaces and fed through two circuits one of which in the initiation of the braking operation is included in the circuit of the line or main source, the other of which forms part of the motor-circuit running as a generator, and means whereby the first-named circuit may be connected to the motor running as a generator.

28. The combination with an electric braking system comprising a brake-winding acting to produce pressure between braking-surfaces and fed through two circuits one of which in the initiation of the braking operation is included in the circuit of the line or main source, the other of which forms part of the motor-circuit running as a generator and means whereby the first-named circuit may be connected to the motor, running as a generator, and parallel with the other circuit.

29. The combination with an electric braking system comprising a brake-winding acting to produce pressure between braking-surfaces and fed through two circuits of different resistance, means whereby, on the initiation of the braking operation, the circuit of higher resistance is connected with the line or main source, means whereby the circuit of lower resistance is connected with the motor running as a generator and means for connecting the circuit of higher resistance to the motor running as a generator.

30. The combination with an electric braking system comprising a brake-winding acting to produce pressure between braking-surfaces and fed through two circuits of different resistance, means whereby, on the initiation of the braking operation, the circuit of higher resistance is connected with the line or main source, means whereby the circuit of lower resistance is connected with the motor running as a generator, means for connecting the circuit of higher resistance to the motor running as a generator, and means for automatically controlling or varying the current in said circuit of lower resistance within appropriate limits relatively to the speed of the vehicle.

31. The combination with an electric braking system comprising a brake-winding acting to produce pressure between braking-surfaces and fed through two circuits of different resistance, means whereby, on the initiation of the braking operation, the circuit of higher resistance is connected with the line or main source, means whereby the circuit of lower resistance is connected with the motor running as a generator, means for connecting the circuit of higher resistance to the motor running as a generator, and means for varying the resistance of said circuit of lower resistance within appropriate limits relatively to the speed of the vehicle.

32. In an electric braking system for electrically-propelled vehicles, a motor for propelling the vehicle, circuit connections for supplying it with current from a suitable source, an electromagnetic brake apparatus having two windings, one adapted to the line-current and the other to the current developed by the motor when run as a generator, means for cutting off current from said source to the motor and including one of said windings in the circuit of said source, a braking-circuit including the other of said windings and in which the motor, then running as a generator, may be included, and means for removing the first-named winding from the circuit of said source and including it in said braking-circuit.

33. In an electric braking system for electrically-propelled vehicles, a motor for propelling the vehicle, circuit connections for supplying it with current from a suitable source, an electromagnetic brake apparatus having two windings, means for cutting off current from said source to the motor, and including one of said windings in the circuit of said source, a braking-circuit including the other of said windings and in which the motor, then running as a generator, may be included, and means for removing the first-named winding from the circuit of said source, and including it in said braking-circuit in parallel with the other winding.

34. In an electric braking system for electrically-propelled vehicles, a motor for propelling the vehicle, circuit connections for supplying it with current from a suitable source, an electromagnetic brake apparatus having two windings, means for cutting off current from said source to the motor, and including one of said windings in the circuit of said source, a braking-circuit including the other of said windings and in which the motor, then running as a generator, may be included, and an electromagnetic controller included in the braking-circuit and actuated by the current therein to transfer said first-named winding to the braking-circuit and to regulate the braking effect relatively to the speed of the vehicle.

35. In an electric braking system for electrically-propelled vehicles, a motor for propelling the vehicle, circuit connections for supplying it with current from a suitable source, an electromagnetic brake apparatus having two windings, means for cutting off current from said source from the motor, and including one of said windings in the circuit of said source, a braking-circuit including the other of said windings and in which the motor, then running as a generator, may be included, and an electromagnetic controller included in the braking-circuit and actuated by the current therein to transfer said first-named winding to the braking-circuit and to regulate the braking effect relatively to the speed of the vehicle.

36. In an electric braking system for electrically-propelled vehicles, a motor for propelling the vehicle, circuit connections for supplying it with current from a suitable source, an electromagnetic brake apparatus having two windings, means for cutting off current from said source from the motor, and including one of said windings in the circuit of said source, a braking-circuit including the other of said windings and in which the motor, then running as a generator, may be included, and an electromagnetic controller included in the braking-circuit and actuated by the current therein to transfer said first-named winding to the braking-circuit in parallel with the other winding and to regulate the braking effect relatively to the speed of the vehicle.

37. In an electric braking system for electrically-propelled vehicles, a motor for propelling the vehicle, circuit connections for supplying it with current from a suitable source, an electromagnetic brake apparatus having two windings, means for cutting off current from said source from the motor, and including one of said windings in the circuit of said source, a braking-circuit including the other of said windings and in which the motor, then running as a generator, may be included, and an electromagnetic controller included in the braking-circuit and actuated by the current therein to transfer said first-named winding to the braking-circuit in parallel with its own winding and to regulate the braking action relatively to the speed of the vehicle.

38. In an electric braking system, an electromagnetic controller placed in the braking-circuit and actuated by the current therein to automatically control the braking effect relatively to the speed of the vehicle and means for at will regulating the amount of current of the braking-circuit effective in the winding of the electromagnetic controller to thereby regulate the action of the electromagnetic controller.

39. In an electric braking system for electrically-propelled vehicles, the combination of the vehicle-propelling motor, a braking-circuit in which the motor may be connected to run as a generator, and in said circuit an electromagnetic brake-winding, an electromagnetic controller actuated by current in said circuit to automatically regulate the braking action of said winding relatively to the speed of the vehicle, and means for at will regulating the amount of current of the braking-circuit effective in the winding of the electromagnetic controller to thereby regulate the action of the electromagnetic controller.

40. In an electric braking system for electrically-propelled vehicles, the combination of the vehicle-propelling motor, a braking-circuit in which the motor may be connected to run as a generator, and in said circuit an electromagnetic brake-winding, an electromagnetic controller comprising a variable resistance, a means for including more or less of said resistance in the circuit, and, acting on said means, an electromagnet and a reactionary device acting in opposition to the magnet, whereby the current in the brake-winding is controlled relatively to the speed of the car, and means for at will regulating the amount of current of the braking-circuit effective in the winding of the electromagnetic controller to thereby regulate the action of the electromagnetic controller.

41. In an electric braking system for electrically-propelled vehicles, a motor for propelling the vehicle, circuit connections for supplying it with current from a suitable source, an electromagnetic brake apparatus having two windings, means for cutting off current from said source from the motor, and including one of said windings in the circuit of said source, a braking-circuit including the other of said windings and in which the motor, then running as a generator, may be included, an electromagnetic controller included in the braking-circuit and actuated by the current therein to transfer said first-named winding to the braking-circuit and to regulate the braking action relatively to the speed of the vehicle, and means for at will regulating the amount of current of the braking-circuit effective in the winding of the electromagnetic controller to thereby regulate the action of the electromagnetic controller.

42. In an electric braking system for electrically-propelled vehicles, a motor for propelling the vehicle, circuit connections for supplying it with current from a suitable source, an electromagnetic brake apparatus having two windings, means for cutting off current from said source to the motor, and including one of said windings in the circuit of said source, a braking-circuit including the other of said windings and in which the motor, then running as a generator, may be included, an electromagnetic controller included in the braking-circuit and actuated by the current therein to transfer said first-named winding to the braking-circuit in parallel with the other winding and to regulate the braking action relatively to the speed of the vehicle, and means for at will regulating the amount of current of the braking-circuit effective in the winding of the electromagnetic controller to thereby regulate the action of the electromagnetic controller.

43. In an electric braking system for electrically-propelled vehicles, the combination of the vehicle-propelling motor, means for supplying it with current from a suitable source, a braking-circuit in which the motor may be connected to run as a generator, means for cutting off current to the motor from said source, passing current therefrom through the field of the motor to excite it, an electromagnetic brake apparatus having a winding included in said braking-circuit, and an electromagnetic controller also in said circuit and actuated by the current therein to automatically regulate the braking action of said winding relatively to the speed of the vehicle.

44. In an electric braking system for electrically-propelled vehicles, a motor for propelling the vehicle, circuit connections for supplying it with current from a suitable source, an electromagnetic brake apparatus having two windings, means for cutting off current from said source to the motor, directing current therefrom through the field of the motor, and including one of said windings in the circuit of said source, a braking-circuit including the other of said windings and in which the motor then running as a generator may be included, and means for removing the first-named winding from the circuit of said source and including it in the said braking-circuit.

45. In an electric braking system for electrically-propelled vehicles, a motor for propelling the vehicle, circuit connections for supplying it with current from a suitable source, an electromagnetic brake apparatus having two windings, means for cutting off current from said source to the motor, directing current therefrom through the field of the motor, and including one of said windings in the circuit of said source in series with the motor-field, a braking-circuit including the other of said windings and in which the motor, then running as a generator, may be included, and means for removing the first-named winding from the circuit of said source and including it in the said braking-circuit.

46. In an electric braking system for electrically-propelled vehicles, a motor for propelling the vehicle, circuit connections for supplying it with current from a suitable source, an electromagnetic brake apparatus having two windings, means for cutting off current from said source to the motor, directing current therefrom through the field of the motor, and including one of said windings in the circuit of said source, a braking-circuit including the other of said windings and in which the motor, then running as a generator, may be included, and means for removing the first-named winding from the circuit of said source and including it in said braking-circuit in parallel with the other winding.

47. In an electric braking system for electrically-propelled vehicles, a motor for propelling the vehicle, circuit connections for supplying it with current from a suitable source, an electromagnetic brake apparatus having two windings, means for cutting off current from said source to the motor, directing current therefrom through the field of the motor, and including one of said windings in the circuit of said source, a braking-circuit including the other of said windings and in which the motor, then running as a generator, may be included, and an electromagnetic controller included in the braking-circuit and actuated by the current therein to transfer said first-named winding to the braking-circuit and to regulate the braking action relatively to the speed of the vehicle.

48. In an electric braking system for electrically-propelled vehicles, a motor for propelling the vehicle, circuit connections for supplying it with current from a suitable source, an electromagnetic brake apparatus having two windings, means for cutting off current from said source to the motor, directing current therefrom through the field of the motor, and including one of said windings in the circuit of said source, a braking-circuit including the other of said windings and in which the motor, then running as a generator, may be included, and an electromagnetic controller included in the braking-circuit and actuated by the current therein to transfer said first-named winding to the braking-circuit in parallel with the other winding and to regulate the braking action relatively to the speed of the vehicle.

49. In an electric braking system for electrically-propelled vehicles, a motor for propelling the vehicle, circuit connections for supplying it with current from a suitable source, an electromagnetic brake apparatus having two windings, means for cutting off current from said source to the motor, directing current therefrom through the field of the motor, and including one of said windings in the circuit of said source, a braking-circuit including the other of said windings and in which the motor, then running as a generator, may be included, an electromagnetic controller included in the braking-circuit and actuated by the current therein to transfer said first-named winding to the braking-circuit and to regulate the braking action relatively to the speed of the vehicle, and means for at will regulating the amount of current of the braking-circuit effective in the winding of the electromagnetic controller to thereby regulate the action of the electromagnetic controller.

50. In an electric braking system for electrically-propelled vehicles, a motor for propelling the vehicle, circuit connections for supplying it with current from a suitable source, an electromagnetic brake apparatus having two windings, means for cutting off current from said source to the motor, directing current therefrom through the field of the motor, and including one of said windings in the circuit of said source, a braking-circuit including the other of said windings and in which the motor, then running as a generator, may be included, an electromagnetic controller included in the braking-circuit and actuated by the current therein to transfer said first-named winding to the braking-circuit in parallel with the other winding, and to regulate the braking action relatively to the speed of the vehicle, and means for at will regulating the amount of current of the braking-circuit effective in the winding of the electromagnetic controller to thereby regulate the action of the electromagnetic controller.

51. In an electric braking system for electrically-propelled vehicles, the combination of the motor, contacts and circuit connections for supplying it with variable current from a suitable source, a brake-controller on the actuation of which current is cut off from the motor, a master-controller and means interposed between it and the brake-controller for actuating the latter on the movement of the former, a braking-circuit including the motor established on the actuation of the brake-controller, and the winding of an electromagnetic brake apparatus included in the brake-circuit.

52. In an electric braking system for electrically-propelled vehicles, the combination of the motor, contacts and circuit connections for supplying it with variable current from a suitable source, a brake-controller on the actuation of which current is cut off from the motor and directed through its field, a master-controller, and means interposed between it and the brake-controller for actuating the latter on the movement of the former, a braking-circuit including the motor established on the actuation of the brake-controller, and the winding of an electromagnetic brake apparatus included in the brake-circuit.

53. In an electric braking system for electrically-propelled vehicles, the combination of the motor, contacts and circuit connections for supplying it with variable current from a suitable source, a brake-controller on the actuation of which current is cut off from the motor and directed through its field, a master-controller, and means interposed between it and the brake-controller for actuating the latter on the movement of the former, a braking-circuit including the motor established on the actuation of the brake-controller, the winding of an electromagnetic brake apparatus included in the brake-circuit, and an electromagnetic controller also included in the braking-circuit and actuated by current therein to control the braking action relatively to the speed of the vehicle.

54. In an electric braking system for electrically-propelled vehicles, the combination of the motor, contacts and circuit connections for supplying it with variable current from a suitable source, a brake-controller on the actuation of which current is cut off from the motor, a master-controller and means interposed between it and the brake-controller for actuating the latter on the movement of the former, a braking-circuit including the motor established on the actuation of the brake-controller, the winding of an electromagnetic brake apparatus included in the brake-circuit, and an electromagnetic controller also included in the braking-circuit and actuated by current therein to control the braking action relatively to the speed of the vehicle.

55. In an electric braking system for electrically-propelled vehicles, the combination of the motor, contacts and circuit connections for supplying it with variable current from a suitable source, a brake-controller on the actuation of which current is cut off from the motor, a master-controller and means interposed between it and the brake-controller for actuating the latter on the movement of the former, a braking-circuit including the motor established on the actuation of the brake-controller, an electromagnetic brake apparatus having two windings, one of which is then included in the circuit of said source and the other in said braking-circuit, and means for transferring the first-mentioned winding to the braking-circuit.

56. In an electric braking system for electrically-propelled vehicles, the combination of the motor, contacts and circuit connections for supplying it with variable current from a suitable source, a brake-controller on the actuation of which current is cut off from the motor, a master-controller and means interposed between it and the brake-controller for actuating the latter on the movement of the former, a braking-circuit including the motor established on the actuation of the brake-controller, an electromagnetic brake apparatus having two windings, one of which is then included in the circuit of said source and the other in the braking-circuit, and means for transferring the first-mentioned winding to the braking-circuit in parallel with the second-named winding.

57. In an electric braking system for electrically-propelled vehicles, the combination of the motor, contacts and circuit connections for supplying it with variable current from a suitable source, a brake-controller on the actuation of which current is cut off from the motor, a master-controller and means interposed between it and the brake-controller for actuating the latter on the movement of the former, a braking-circuit including the motor established on the actuation of the brake-controller, an electromagnetic brake apparatus having two windings, one of which is then included in the circuit of said source and the other in the braking-circuit, and an electromagnetic braking-current controller included in the braking-circuit and actuated by the current therein to transfer said first-named winding to the braking-circuit and to control the braking action relatively to the speed of the vehicle.

58. In an electric braking system for electrically-propelled vehicles, the combination of the motor, contacts and circuit connections for supplying it with variable current from a suitable source, a brake-controller on the actuation of which current is cut off from the motor, a master-controller and means interposed between it and the brake-controller for actuating the latter on the movement of the former, a braking-circuit including the motor established on the actuation of the brake-controller, an electromagnetic brake apparatus having two windings, one of which is then included in the circuit of said source and the other in the braking-circuit, and an electromagnetic braking-current controller also included in the braking-circuit and actuated by the current therein to transfer said first-named winding to the braking-circuit in parallel with the other winding, and to control the braking action relatively to the speed of the vehicle.

59. In an electric braking system for electrically-propelled vehicles, the combination of the motor, contacts and circuit connections for supplying it with variable current from a suitable source, a brake-controller on the actuation of which current is cut off from the motor, a master-controller and means interposed between it and the brake-controller for actuating the latter on the movement of the former, a braking-circuit including the motor established on the actuation of the brake-controller, the winding of an electromagnetic brake apparatus also included in the brake-circuit, and means for varying the amount of current in the braking-circuit effective in the coil of said electromagnetic controller to vary its control of the braking operation.

60. In an electric braking system for electrically-propelled vehicles, the combination of the motor, contacts and circuit connections for supplying it with variable current from a suitable source, a brake-controller on the actuation of which current is cut off from the motor and current from said source directed through the field of the motor, a master-controller and means interposed between it and the brake-controller for actuating the latter on the movement of the former, a braking-circuit including the motor established on the actuation of the brake-controller, the winding of an electromagnetic brake apparatus also included in the brake-circuit, an electromagnetic controller also included in the braking-circuit and actuated by current therein to control the braking action relatively to the speed of the vehicle, and means for varying the amount of current in the braking-circuit effective in the winding of said electromagnetic controller to vary its control of the braking operation.

61. In an electric braking system for electrically-propelled vehicles, the combination of the motor, contacts and circuit connections for supplying it with variable current from a suitable source, a brake-controller on the actuation of which current is cut off from the motor, a master-controller and means interposed between it and the brake-controller for actuating the latter on the movement of the former, a braking-circuit including the motor established on the actuation of the brake-controller, an electromagnetic brake apparatus having two windings, one of which is then included in the circuit of said source and the other in the braking-circuit, an electromagnetic braking-current controller also included in the braking-circuit and actuated by the current therein to transfer said first-named winding to the braking-circuit and to control the braking action relatively to the speed of the vehicle, and means for varying the amount of current in the braking-circuit effective in the coil of said electromagnetic controller to vary its control of the braking operation.

62. An electric braking system comprising an automatic controller included in a braking-circuit with a motor operating as a generator, a brake-winding $m\ c$ included in the circuit with the automatic controller and another brake-winding also included in said circuit in shunt to the automatic controller and the coil $m\ c$.

63. An electric braking system comprising a braking-circuit, a motor running as a generator therein, an automatic controller in said circuit and two brake-windings one in series with the automatic controller and the other in shunt thereto.

64. An electric braking system comprising a braking-circuit, a motor running as a generator, an automatic controller connected in said circuit, a coarse-wire brake-winding connected in series with the automatic controller and a fine-wire brake-winding adapted to be connected either in the braking-circuit or in circuit with main source of energy.

65. In an electric braking system, the combination of two or more vehicles or units coupled to travel together, a train-cable on each unit for electrically connecting them, a braking-circuit on each unit comprising a source of energy, electromagnetic brake-winding and an automatic controller acting to control the braking action relatively to the speed of the vehicle, and contacts and circuit connections by which the braking operation on each unit may be controlled from a single point on either of them.

66. In an electric braking system, two or more vehicles or units connected to travel together, a train-cable on each unit for electrically controlling a braking system on each unit comprising a braking-circuit containing the vehicle-motor then adapted to run as a generator, a brake-winding and an automatic controller, and a second brake-winding adapted to be connected either in circuit with the line or main source of energy or in said braking-circuit, and contacts and circuit connections for controlling the braking operation on each unit from a single point on either of them.

67. In an electric braking system, the combination of two or more vehicles or units coupled to travel together, a train-cable on each unit for electrically connecting them, and an electromagnetic brake-winding on the several units adapted to be connected in circuit with the line or source of energy, devices for varying the braking action of said winding, and contacts and circuit connections for initiating the braking operation and varying the braking action from a single point on either unit.

68. In an electric braking system, the combination of two or more vehicles or units coupled to travel together, an electromagnetic braking system on each unit, electromagnetic devices on each unit for throwing its electromagnetic braking system into operation, a train-cable with which said electromagnetic devices are connected and a brake master-controller on each unit connected with the train-cable for operating said electromagnetic devices.

69. In an electric braking system, the combination of two or more vehicles or units coupled to travel together, an electromagnetic braking system on each unit comprising a winding adapted to receive current from the line or main source, electromagnetic devices on each unit for throwing its electromagnetic braking system into operation, a train-cable with which said electromagnetic devices are connected and a brake master-controller on each unit connected with the train-cable for operating said electromagnetic devices.

70. In an electric braking system, the combination of two or more vehicles or units coupled to travel together, an electromagnetic braking system on each unit comprising a winding adapted to the current generated by the motor when running as a generator in the brake-circuit, electromagnetic devices on each unit for throwing its braking system into operation, a train-cable with which said electromagnetic devices are connected and a brake master-controller on each unit connected with the train-cable for operating said electromagnetic devices.

71. In an electric braking system, the combination of two or mor vehicles or units coupled to travel together, an electromagnetic braking system on each unit comprising a winding adapted to receive current from the line or main source and a winding adapted to the current generated by the motor when running as a generator in the brake-circuit, electromagnetic devices on each unit for throwing its braking system into operation, a train-cable with which said electromagnetic devices are connected and a brake master-controller on each unit connected with the train-cable for operating said electromagnetic devices.

72. In an electric braking system, the combination of two or more vehicles or units coupled to travel together, an electromagnetic braking system, a brake-controller therefor and a power-controller on each unit, a train-cable electrically connecting the units, a brake master-controller and a power master-controller on each unit connected with the train-cable and on each unit an interlock electromagnet that holds the brake-controller in braking position until the connection from the line or source through the power-controller to the motor is open.

73. In an electric braking system, the combination of two or more vehicles or units coupled to run together, a braking system on each unit comprising a winding adapted to currents from the line or source and a winding adapted to currents from the motor when run as a generator and means on each unit whereby the braking system may be controlled to first include the first-named winding in circuit with the line and then the second-named winding in circuit with the motor running as a generator.

74. In an electric braking system, the combination of two or more vehicles or units coupled to run together, a braking system on each unit comprising a winding adapted to currents from the line or source and a winding adapted to currents from the motor when run as a generator and means on each unit whereby the braking system may be controlled to first include the first-named winding in circuit with the line and then the second-named winding and the first-named winding in circuit with the motor running as a generator.

75. In an electric braking system, the combination of two or more vehicles or units coupled to travel together, an independent braking system on each unit comprising an automatic controller for regulating the braking action relatively to the speed of the unit and means for controlling the respective braking systems of the several units from a single point on either of them.

76. A car-brake having an actuating power-generator driven by momentum of the car and adapted to furnish power diminishing in intensity as the speed of the car diminishes and automatic means for controlling the brake-pressure throughout the period of a braking operation, in relation to the speed of the car, to thereby increase the efficiency of the braking operation.

77. A car-brake having an actuating power-generator driven by momentum of the car and adapted to furnish power diminishing in intensity as the speed of the car diminishes, automatic means for varying the braking-pressure throughout the period of a braking operation, in relation to the speed of the car to thereby increase the efficiency of the braking operation, and means, under the control of the motorman, by which he may, at will, maintain a maximum or some lesser rate of retardation.

78. The combination with a car-brake and a generator adapted to supply power for operating the brake, whose force is greatest when the speed of the car-wheels is greatest, of automatic means for retarding diminution of said power in intensity in relation to the speed of the car throughout the braking operation.

79. A car-brake-actuating mechanism arranged to apply brakes with a pressure which is greatest when the speed of the car-wheels is greatest, and is reduced when such speed is reduced, in combination with means for causing such pressure to decrease in relation to the reduction in speed, but at a less rate.

80. The combination with brake-actuating mechanism, of means for supplying power thereto arranged to supply the greatest pressure when the speed of the car-wheels is greatest, and to diminish the pressure when the speed of the wheels is reduced, and automatic means arranged to cause the brake-pressure to diminish in relation to the reduction in speed but at a less rate.

81. A car-brake, having an actuating power-generator driven by the momentum of the car, and adapted thereby to furnish power diminishing in intensity as the speed of the car-wheels diminishes, and automatic means for, throughout the period of a braking operation, retarding the rate of diminution of the brake-pressure, whereby when the wheels cease to rotate some pressure will still be applied upon the brake.

82. An electric braking system comprising the combination of the propelling-motor driven as a generator by momentum of the vehicle, an electromagnetic brake apparatus in the circuit from the generator, and an automatic electromagnetic controller also in the circuit from the generator acting to control the current therein in relation to the speed of the vehicle and negative torque of the generator whereby the pressure of the braking-surfaces is varied to thereby increase the efficiency of the braking operation.

83. In an electric braking system, a brake-operating apparatus comprising two independent circuits of different resistance both fed by the vehicle-motor running as a generator, one of the circuits being of constant resistance and causing a braking action substantially proportional to the speed of the vehicle, and means for automatically varying the resistance of the other circuit within appropriate limits relative to the speed of the car and negative torque of the generator.

84. A car-brake having an actuating power-generator driven by momentum of the car and adapted to furnish power diminishing in intensity as the speed of the car diminishes and automatic means for controlling the brake-pressure in relation to the speed of the car and the negative torque of the generator whereby the efficiency of the braking operation is increased.

85. An electric braking system comprising a motor driven as a generator by momentum of the vehicle, an electromagnetic brake apparatus having two circuits; an automatically-acting electromagnetic controller included in one of said circuits and acting to vary the current therein in relation to the speed of the vehicle and negative torque of the generator.

86. An electric braking system comprising a motor driven as a generator by momentum of the vehicle, an electromagnetic brake apparatus having two circuits one of which is of constant and the other of variable resistance and an automatically-acting electromagnetic controller in the latter circuit acting to vary the current therein in relation to the speed of the vehicle and negative torque of the generator.

In testimony whereof I have hereunto subscribed my name.

JOSEPH N. MAHONEY.

Witnesses:
 EZEK. FIXMAN,
 W. A. STAHLIN.